(12) United States Patent
Yoshimura et al.

(10) Patent No.: US 8,842,427 B2
(45) Date of Patent: Sep. 23, 2014

(54) ELECTRICAL APPARATUS SYSTEM

(75) Inventors: Takayoshi Yoshimura, Anjo (JP);
Munetoshi Goto, Anjo (JP); Syusaku Wakatsuki, Anjo (JP)

(73) Assignee: Makita Corporation, Anjo-Shi (JP)

( * ) Notice: Subject to any disclaimer, the term of this patent is extended or adjusted under 35 U.S.C. 154(b) by 505 days.

(21) Appl. No.: 13/093,426

(22) Filed: Apr. 25, 2011

(65) Prior Publication Data
US 2011/0267747 A1    Nov. 3, 2011

(30) Foreign Application Priority Data

Apr. 28, 2010   (JP) ................................. 2010-103741

(51) Int. Cl.
*H05K 7/00*    (2006.01)
*H01M 2/10*    (2006.01)
*G06F 1/16*    (2006.01)

(52) U.S. Cl.
CPC .......... *H01M 2/1022* (2013.01); *H01M 2/1055* (2013.01); *Y02E 60/12* (2013.01); *G06F 1/1632* (2013.01); *Y10S 248/917* (2013.01)
USPC .................. 361/679.41; 361/679.01; 248/917

(58) Field of Classification Search
CPC ............. Y02E 60/12; B25F 5/00; B25F 5/02; H02K 7/145; H01M 10/425; H01M 2/1022; H01M 2220/30; H01M 2/10; H02J 7/0068; G06F 1/1632; G06F 1/1626; G06F 1/26; G06F 1/16; G06F 1/1613; G06F 1/1684; G06F 1/203; G06F 1/1601; G06F 1/1616; G06F 1/181; H05K 5/00; H05K 5/02
USPC ............. 361/679.01, 679.02, 679.26, 679.27, 361/679.09, 679.41; 248/917–924; 429/99, 429/100

See application file for complete search history.

(56) References Cited

U.S. PATENT DOCUMENTS

| | | | |
|---|---|---|---|
| 6,504,710 B2 * | 1/2003 | Sutton et al. ............. | 361/679.41 |
| 6,729,413 B2 * | 5/2004 | Turner et al. .................. | 173/217 |
| 6,995,977 B2 * | 2/2006 | Yang ........................ | 361/679.55 |
| 7,333,325 B2 * | 2/2008 | DeLuga et al. .......... | 361/679.55 |
| 7,380,143 B2 * | 5/2008 | Gold et al. ..................... | 713/300 |
| 7,480,139 B2 * | 1/2009 | Ryder et al. ............. | 361/679.01 |
| 2004/0246670 A1 * | 12/2004 | Lai ................ | 361/683 |
| 2006/0034047 A1 * | 2/2006 | Shin et al. ..................... | 361/683 |

FOREIGN PATENT DOCUMENTS

| | | |
|---|---|---|
| JP | H-07-85852 | 3/1995 |
| JP | A-2007-511931 | 5/2007 |
| JP | A-2008-117756 | 5/2008 |
| WO | WO 2005/041428 A1 | 5/2005 |

OTHER PUBLICATIONS

Office Action dated Nov. 19, 2013 issued in Japanese Patent Application No. 2010-103741 (with English translation).

* cited by examiner

*Primary Examiner* — Anthony Haughton
*Assistant Examiner* — Ingrid Wright
(74) *Attorney, Agent, or Firm* — Oliff PLC (57) ABSTRACT

An electrical apparatus system includes a tool battery used as a power source for an electrical tool, and an electrical apparatus having a battery-connecting portion configured to allow the tool battery to be electrically and mechanically connected thereto or disconnected therefrom. In a state in which the tool battery is electrically and mechanically connected to the battery-connecting portion of the electrical apparatus, the tool battery is exposed on a lower side of the electrical apparatus so as to support the electrical apparatus on an installation surface thereof as a base.

9 Claims, 13 Drawing Sheets

ELECTRICAL APPARATUS SYSTEM

This application claims priority to Japanese patent application serial number 2010-103741, the contents of which are incorporated herein by reference.

BACKGROUND OF THE INVENTION

1. Field of the Invention

The invention relates to an electrical apparatus system including an electrical apparatus other than an electrical tool and also including a tool battery used as a power source for the electrical tool.

2. Description of the Related Art

In Japanese Laid-Open Patent Publication No. 2007-511931, an impact-resistant audio apparatus which can be used with either of an AC power supply or a DC power supply (battery power) is disclosed. The audio apparatus in Japanese Laid-Open Patent Publication No. 2007-511931 includes a rectangular housing, and is configured to accommodate all components such as an audio body, a power source device, and a battery in the interior of the housing. The housing is surrounded by rods assembled into a rectangular frame shape from the front, rear, left, right, above, and below so as to be capable of receiving an impact from the outside with the rods. In addition, the rods assembled into the rectangular frame shape allow the audio apparatus to be installed stably on an installation surface thereof.

However, since the audio apparatus described above is configured to accommodate all the components such as the audio body, the power source device, and the battery in the interior of the housing, the housing is required to have a large size. In addition, the periphery of the housing is surrounded by the rods assembled into the rectangular frame shape. Therefore, the audio apparatus is inevitably upsized.

Thus, there is a need in the art to allow a tool battery having a high impact resistance to be used as a power source for electrical apparatuses other than an electrical tool and enhance an utility value of the tool battery. Further, there is a need in the art to allow the tool battery to support the electrical apparatuses as a base to prevent a supporting mechanism for the electrical apparatuses from becoming a large scale.

SUMMARY OF THE INVENTION

According to one construction, there is provided an electrical apparatus system including a tool battery used as a power source for an electrical tool, and an electrical apparatus other than the electrical tool, the electrical apparatus having a battery-connecting portion configured to allow the tool battery to be connected thereto or to be disconnected therefrom electrically and mechanically, wherein the tool battery is exposed on a lower side of the electrical apparatus and is configured to support the electrical apparatus on an installation surface like a base in a state in which the tool battery is electrically and mechanically connected to the battery-connecting portion of the electrical apparatus.

In this construction, since the electrical apparatus other than the electrical tool is provided with the battery-connecting portion, the tool battery can be connected to the electrical apparatus using the battery-connecting portion. In other words, the tool battery can be used as a power source for the electrical apparatus other than the electrical tool.

Also, in the state in which the electrical apparatus and the tool battery are connected, the tool battery is exposed on the lower side of the electrical apparatus, and supports the electrical apparatus therewith. In other words, the tool battery serves as a supporting base of the electrical apparatuses, so that the supporting mechanism for the electrical apparatuses is prevented from becoming a large scale.

According to another construction, a center of gravity of an entire system is located in the tool battery in a state in which the electrical apparatus and the tool battery are connected.

According to another construction, the weight of the electrical apparatus is smaller than the weight of the tool battery.

Therefore, the electrical apparatus can be supported by the tool battery in a stable state.

According to another construction, a body portion of the electrical apparatus includes a lower projecting portion projecting downward with respect to the battery-connecting portion of the electrical apparatus, and the lower projecting portion of the electrical apparatus is located at a position lower than an upper surface of the tool battery in the state in which the electrical apparatus is connected to the tool battery.

Therefore, the entire height at the time when the electrical apparatus and the tool battery are connected can be reduced by a size corresponding to that of the lower projecting portion.

According to another construction, the height of an entire system is smaller than twice the height of the tool battery in the state in which the electrical apparatus and the tool battery are connected.

According to another construction, the battery-connecting portion of the electrical apparatus is provided at a lower end position of the electrical apparatus, and the battery-connecting portion is configured to be connected to an upper surface side of the tool battery by being slid along the upper surface of the tool battery, and a lower surface of the tool battery comes into contact with the installation surface.

According to another construction, a plurality of the tool batteries can be connected to a single electrical apparatus.

According to another construction, a peripheral edge of the electrical apparatus is covered with a cushioning material.

Therefore, an impact resistance of the electrical apparatus can be improved.

According to another construction, the electrical apparatus is an image display apparatus.

According to another construction, the electrical apparatus includes a reading device for a storage medium and an insertion port which allows insertion and removal of the storage medium, and the insertion port is covered with the tool battery in the state in which the electrical apparatus and the tool battery are connected.

Thus, foreign particles or dust can hardly enter the inside of the insertion port of the electrical apparatus.

According to the above, since the tool battery can be used as the power source for the electrical apparatuses other than the electrical tool, the utility value of the tool battery is enhanced. Since the electrical apparatus is supported by the tool battery as a base, the supporting mechanisms for the electrical apparatuses is prevented from becoming a large scale.

DETAILED DESCRIPTION OF THE INVENTION

Each of the additional features and teachings disclosed above and below may be utilized separately or in conjunction with other features and teachings to provide improved electrical apparatus system. Representative examples of the present teaching, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

Referring now to FIG. 1 to FIG. 12, an electrical apparatus system according to an embodiment will be described. The electrical apparatus system according to the embodiment is a system including an electrical apparatus other than an electrical tool, and a tool battery used as a power source for the electrical tool. In FIGS. 1 to 4, a photo frame is exemplified as the electrical apparatus other than the electrical tool, and FIG. 6 to FIG. 12 show examples of electrical apparatuses other than the photo frame (modifications).

The terms front, rear, left, right, up, and down described in the drawings correspond to the front, rear, left, right, up, and down of the electrical apparatuses (ex. photo frame).

Figure 1:
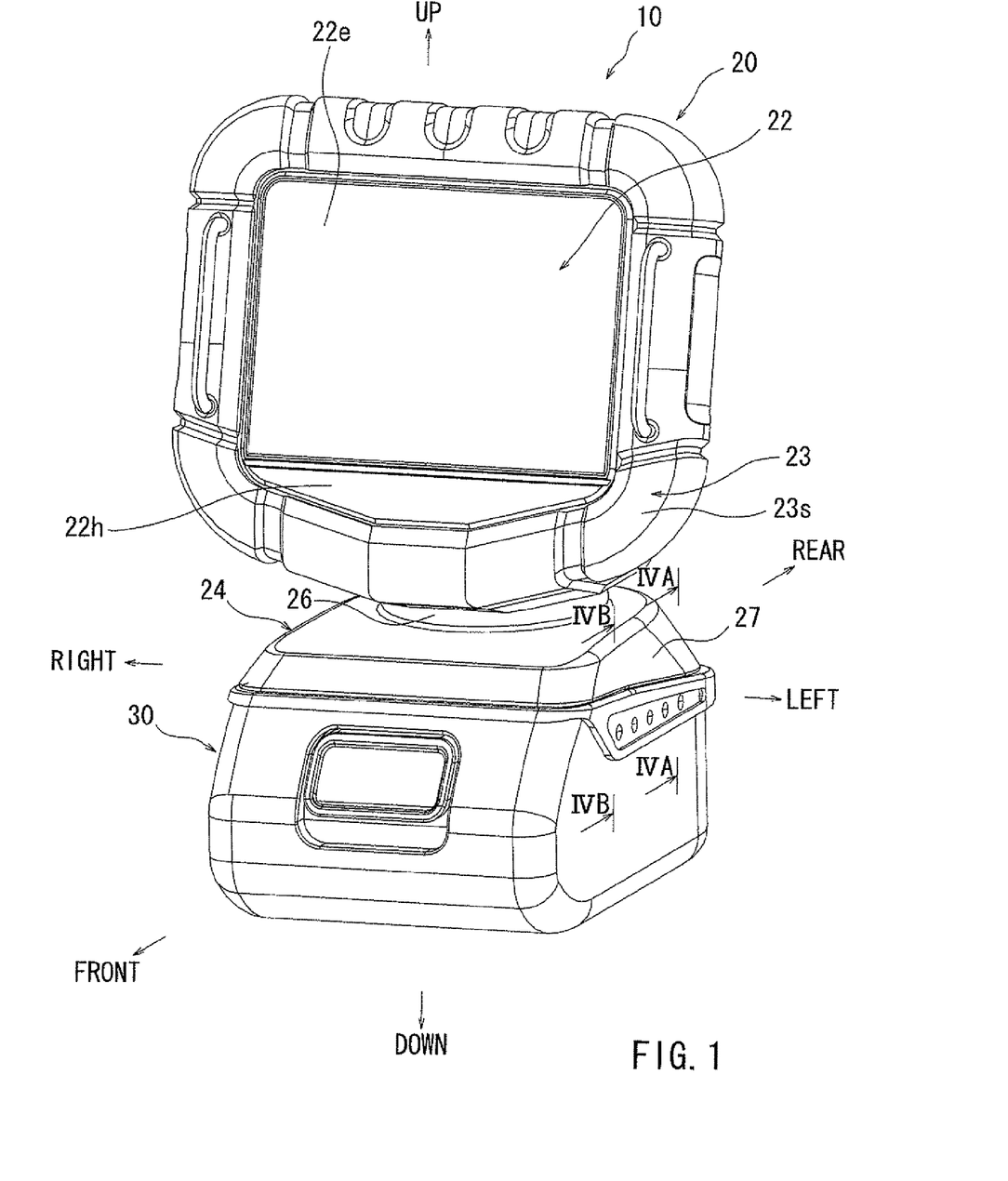
FIG. 1 is a general perspective view of an electrical apparatus system (photo frame system) according to an embodiment of the invention.
Figure 2:
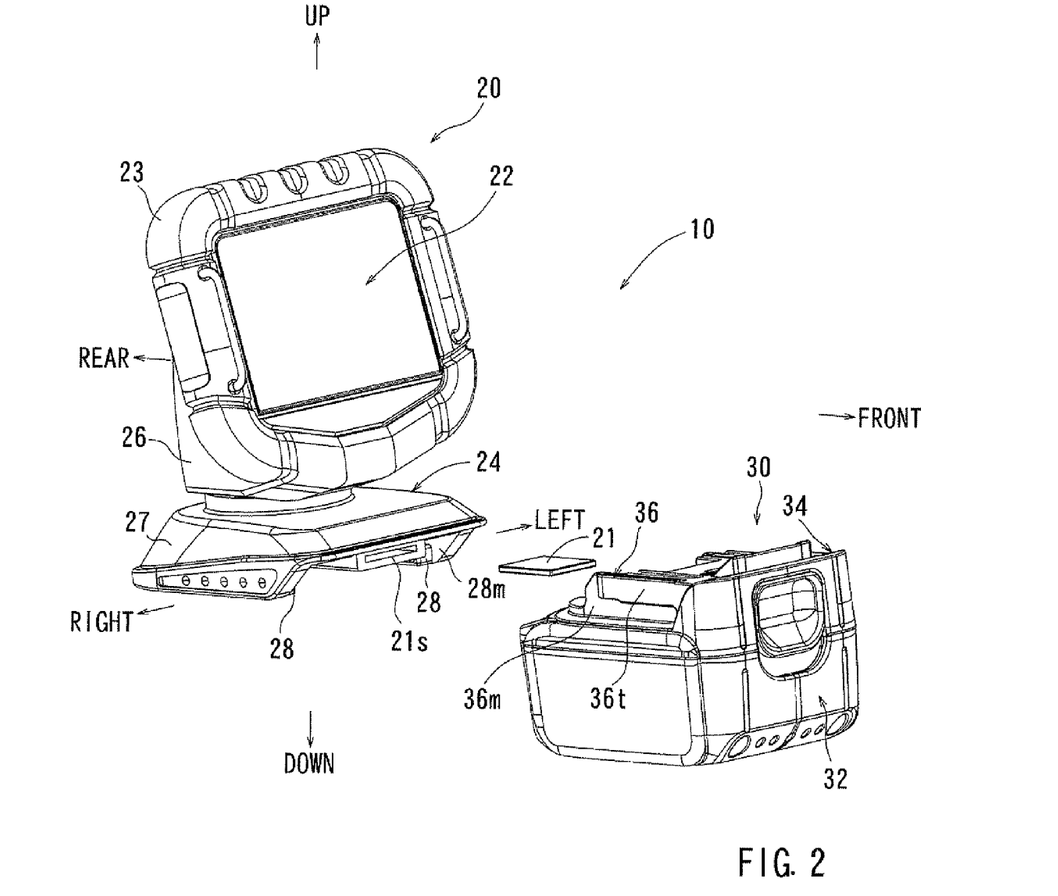
FIG. 2 is an exploded perspective view of the photo frame system according to the embodiment of the invention.
Figure 3:
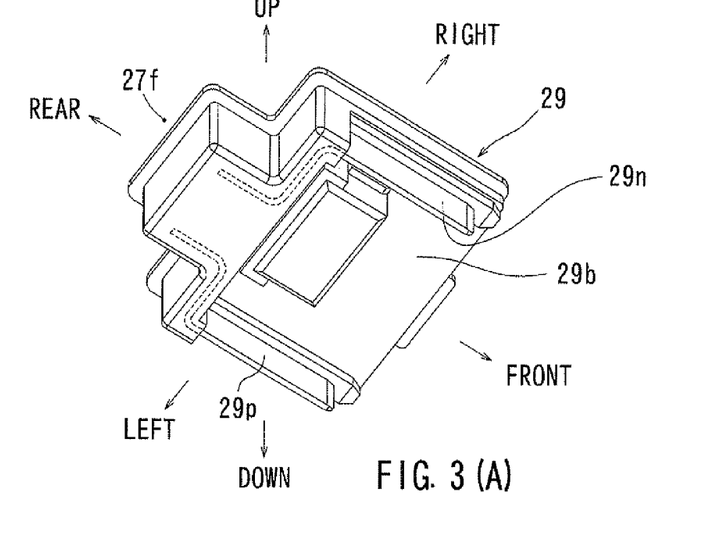
FIG. 3(A) is a perspective view of a terminal unit provided on a seating base of the photo frame.
FIG. 3(B) is a perspective view of a tool battery.
Figure 4:
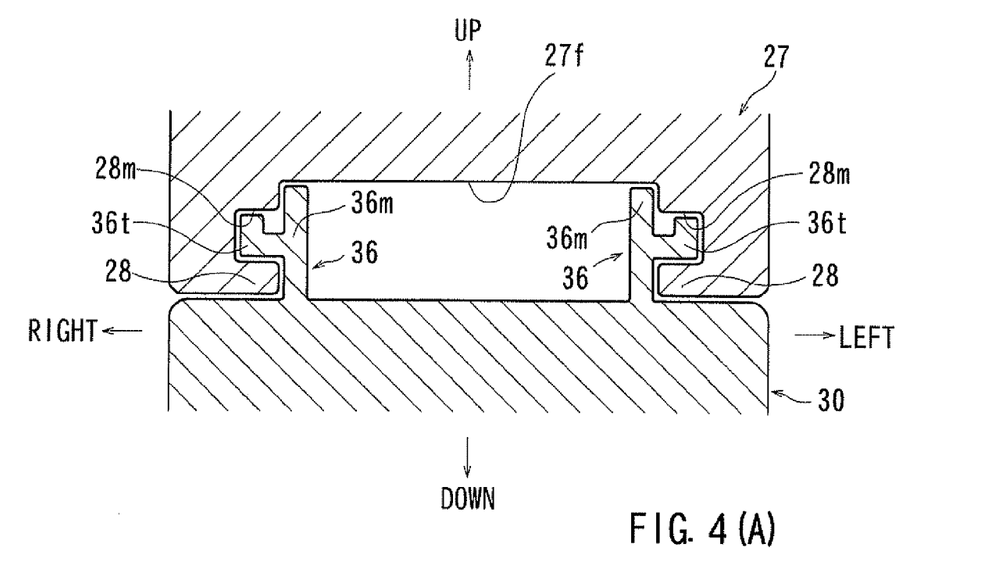
FIG. 4(A) is a vertical cross-sectional view showing a fitting state between the seating base of the photo frame and the tool battery (a cross-sectional view taken along the line IVA-IVA in FIG. 1)
FIG. 4(B) is a vertical cross-sectional view showing a connecting state between the terminal unit of the seating base and the terminal unit of the tool battery (a cross-sectional view taken along the line IVB-IVB in FIG. 1)

A photo frame unit 10 includes a photo frame 20 and a tool battery 30 as shown in FIGS. 1 and 2.

The photo frame 20 is an apparatus configured to read data such as pictures recorded in a storage medium such as an SD card 21 and display the pictures on a monitor, and includes a thin rectangular monitor unit 22, and a seat portion 24 configured to support the monitor unit 22 as shown in FIGS. 1 and 2.

The monitor unit 22 includes a monitor housing 22h and a rectangular image display portion 22e mounted on a center of the monitor housing 22h, and is provided with a power switch, an operating panel etc. (not shown) on a surface of the monitor housing 22h. A peripheral edge of the monitor housing 22h is covered with a cushioning material 23 as shown in FIGS. 1 and 2. The cushioning material 23 is a member which alleviates an impact made on the monitor unit 22 from the outside, and includes a skin portion 23s formed to be hard like a shell and decorating the peripheral edge of the monitor unit 22 and also includes a resilient member (not shown) filled in the skin portion 23s.

The seat portion 24 of the photo frame 20 includes a seating base 27 and a post portion 26 provided on the seating base 27 so as to extend upright in a state of being rotatable in the horizontal direction, and the monitor unit 22 is supported by the post portion 26 from the back side in a state of being rotatable in the vertical direction. Accordingly, the monitor unit 22 is rotatable in the horizontal direction and the vertical direction with respect to the seating base 27.

The seating base 27 of the seat portion 24 is a portion where the tool battery 30 is connected, and is formed into a substantially rectangular cap shape opened on a lower side and a front side thereof. The seating base 27 is formed with rail-shaped ridge portions 28 extending in the direction of sliding movement of the tool battery 30 (front-back direction) at positions of left and right lower end portions thereof so as to project widthwise inward from inner wall surfaces of the seating base 27 as shown in FIGS. 2 and 4(A). Accordingly, rectangular grooves 28m extending in the front-back direction along the ridge portions 28 are formed on upper sides of the left and right ridge portions 28 as shown in FIG. 4(A). The rectangular grooves 28m allow fitting of lateral ridge portions 36t of the slide rails 36 of the tool battery 30 as will be described later.

The seating base 27 is provided with a terminal unit 29 of the photo frame 20 at a center on the backside thereof as shown in FIG. 3(A). The terminal unit 29 is a member for fixing a plus terminal 29p and a minus terminal 29n of an electric circuit (not shown) of the photo frame 20 to predetermined positions on a lower end surface 27f of the seating base 27. The terminal unit 29 includes a flat panel portion 29b to be fixed to the lower end surface 27f of the seating base 27, and the plus terminal 29p and the minus terminal 29n are fixed to a lower surface of the flat panel portion 29b so as to be exposed therefrom. The plus terminal 29p and the minus terminal 29n are each formed into a band plate shape extending in the direction of sliding movement of the tool battery 30 at left and right ends of the flat panel portion 29b, and are formed to extend at substantially a right angle with respect to the lower surface of the flat panel portion 29b.

The seating base 27 is also provided with a reading device (not shown) for a storage medium such as the SD card 21, and includes an insertion port 21s configured to allow insertion or removal of the storage medium such as the SD card 21 on the back side (lower side) thereof as shown in FIG. 2.

Figure 5:
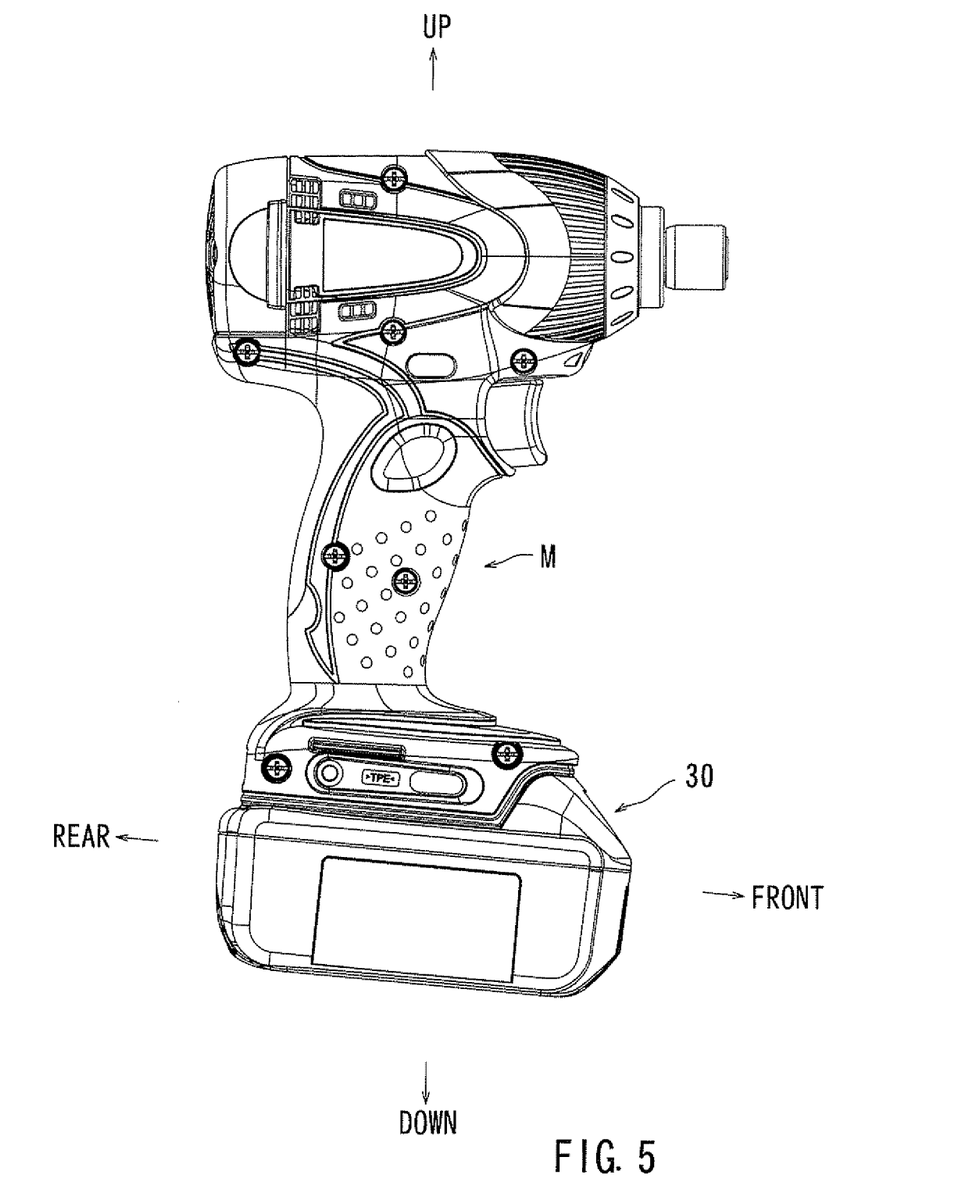
FIG. 5 is a side view showing a state in which the tool battery is connected to the electrical tool.

A tool battery 30 is a battery used as a power source for an electrical tool M as shown in FIG. 5, and has a larger weight than the photo frame 20. The tool battery 30 includes a case body 32 whose top is open and configured to accommodate a plurality of cells (not shown) and a lid portion 34 configured to close an opening of the case body 32 as shown in FIGS. 2 and 3(B). The case body 32 and the lid portion 34 are formed into a substantially rectangular shape in plan view, and the lid portion 34 is secured to the case body 32 with screws at a plurality of positions in a circumferential direction.

Slide rails 36 used for connecting the seating base 27 of the photo frame 20 are formed at both left and right sides on an upper surface of the lid portion 34 of the tool battery 30 so as to extend in the front-back direction. The left and right slide rails 36 include rail body portions 36$m$ and lateral ridge portions 36$t$ projecting widthwise outward from upper side surfaces of the rail body portions 36$m$ by a certain length. The left and right lateral ridge portions 36$t$ are configured to be fitted into the left and right rectangular grooves 28$m$ formed on the seating base 27 as shown in FIG. 4(A). Formed at proximal end portions of the left and right slide rails 36 are stopper portions 36$u$ as shown in FIG. 3(B).

The lid portion 34 of the tool battery 30 is provided with a left guide slit 37 and a right guide slit 38 on a front portion of the upper surface thereof so as to extend in parallel with the slide rails 36. The left guide slit 37 and the right guide slit 38 are configured to allow insertion of the plus terminal 29$p$ and the minus terminal 29$n$ of the terminal unit 29 of the photo frame 20 from the back side in a sliding process. A plus terminal 43 of the tool battery 30 is arranged inside the left guide slit 37 and a minus terminal 44 of the tool battery 30 is arranged inside the right guide slit 38 as shown in FIG. 4(B).

When connecting the tool battery 30 and the photo frame 20, the SD card 21 etc. is firstly inserted into the insertion port 21$s$ provided on the seating base 27 of the photo frame 20, as shown in FIG. 2. Subsequently, the rectangular grooves 28$m$ of the seating base 27 of the photo frame 20 are fitted to the lateral ridge portions 36$t$ of the slide rails 36 of the tool battery 30 at front end portions thereof. In this state, the seating base 27 is slid forward with respect to the tool battery 30, so that the seating base 27 and the tool battery 30 are mechanically connected. In addition, in the sliding step, the plus terminal 29$p$ and the minus terminal 29$n$ of the photo frame 20 are inserted into the left guide slit 37 and the right guide slit 38 of the tool battery 30 respectively, and are guided to the positions of the plus terminal 43 and the minus terminal 44 of the tool battery 30 as shown in FIG. 4(B). After having completed the mechanical connection between the seating base 27 and the tool battery 30, the plus terminal 29$p$ and the minus terminal 29$n$ of the photo frame 20 are electrically connected to the plus terminal 43 and the minus terminal 44 of the tool battery 30 (see FIG. 1). In this state, usage of the photo frame 20 is enabled, and the insertion port 21$s$ of the seating base 27 of the photo frame 20 is covered with the tool battery 30. Then, the photo frame 20 is supported by a supporting base type tool battery 30.

The seating base 27 of the photo frame 20 corresponds to a battery-connecting portion of the invention.

According to the photo frame unit 10 in the embodiment, since the seating base 27 of the photo frame 20 is configured to allow the connection of the tool battery 30, the tool battery 30 can be connected to the photo frame 20 using the seating base 27. In other words, the tool battery 30 can be used as a power source for the photo frame 20 (the electrical apparatus other than the electrical tool M).

In the state in which the photo frame 20 and the tool battery 30 are connected, the tool battery 30 is exposed on the lower side of the photo frame 20, and supports the photo frame 20 thereby like a base. In other words, the tool battery 30 serves as a supporting base of the photo frame 20, so that the supporting mechanism of the photo frame 20 is prevented from becoming a large scale.

Since the weight of the photo frame 20 is smaller than the weight of the tool battery 30, a center of gravity of an entire system is located in the tool battery 30 in a state in which the photo frame 20 and the tool battery 30 are connected. Therefore, the photo frame 20 can be supported by the tool battery 30 in a stable state.

Since the peripheral edge of the monitor unit 22 of the photo frame 20 is covered with the cushioning material 23, the impact resistance of the photo frame 20 can be improved.

The insertion port 21$s$ of the SD card 21 etc. of the photo frame 20 is covered with the tool battery 30 in the state in which the photo frame 20 and the tool battery 30 are connected, foreign particles or dust can hardly enter through the insertion port 21$s$.

Figure 6:
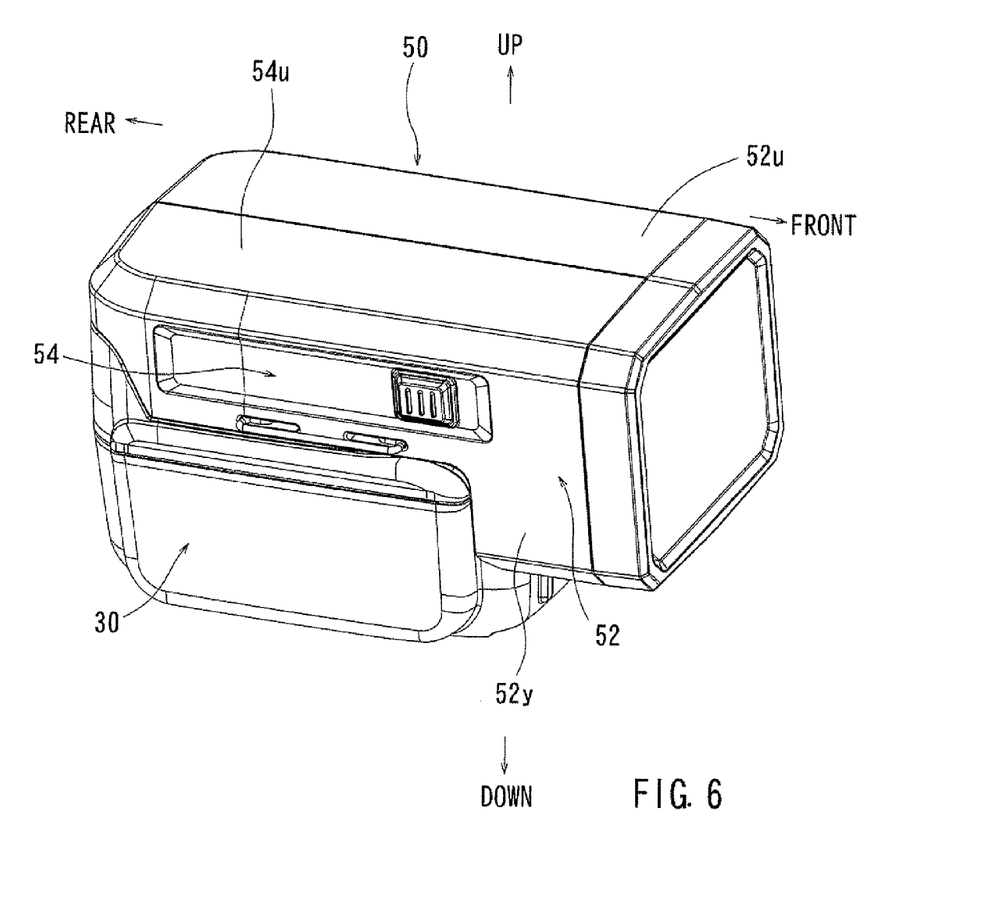
FIG. 6 is a perspective view of the electrical apparatus system in a state in which an electrical apparatus (TV set) is used according to a modification.

The invention is not limited to the embodiment described above, and may be modified without departing the scope of the invention. For example, in the embodiment, the photo frame 20 is exemplified as the electrical apparatus other than the electrical tool. However, a TV set 50 may be used as the electrical apparatus as shown in FIG. 6. Here, the TV set 50 is formed into an inverted L-shape in side view with a TV body portion 52 and a battery-connecting portion 54 provided on the back side of the TV body portion 52. In other words, a upper surface 52$u$ of the TV body portion 52 and a upper surface 54$u$ of the battery-connecting portion 54 are flush with each other and the height of the TV body portion 52 is set to be approximately twice the height of the battery-connecting portion 54. The width of the TV set 50 is set to be substantially the same value as the width of the tool battery 30, and the height of the TV body portion 52 of the TV set 50 is set to be substantially the same value as the height of the tool battery 30. Furthermore, the length (length in the front-back direction) of the battery-connecting portion 54 of the TV set 50 is set to be substantially the same value as the length (the length in the front-back direction) of the tool battery 30. The battery-connecting portion 54 of the TV set 50 is configured to allow mechanical and electrical connections with the tool battery 30 by being slid with respect to the tool battery 30 in the horizontal direction in the same manner as the seating base 27 of the photo frame 20 described above.

Since the TV set 50 is formed into the inverted L-shape in side view with the TV body portion 52 and the battery-connecting portion 54 in this manner, a lower projecting portion 52$y$ of the TV body portion 52 is located at a position lower than the upper surface of the tool battery 30 in the state in which the TV set 50 and the tool battery 30 are connected. Therefore, the entire height of the system at the time when the TV set 50 and the tool battery 30 are connected can be reduced by a size corresponding to that of the lower projecting portion 52$y$, whereby the entire height can be reduced to be smaller than twice the height of the tool battery 30.

Figure 7:
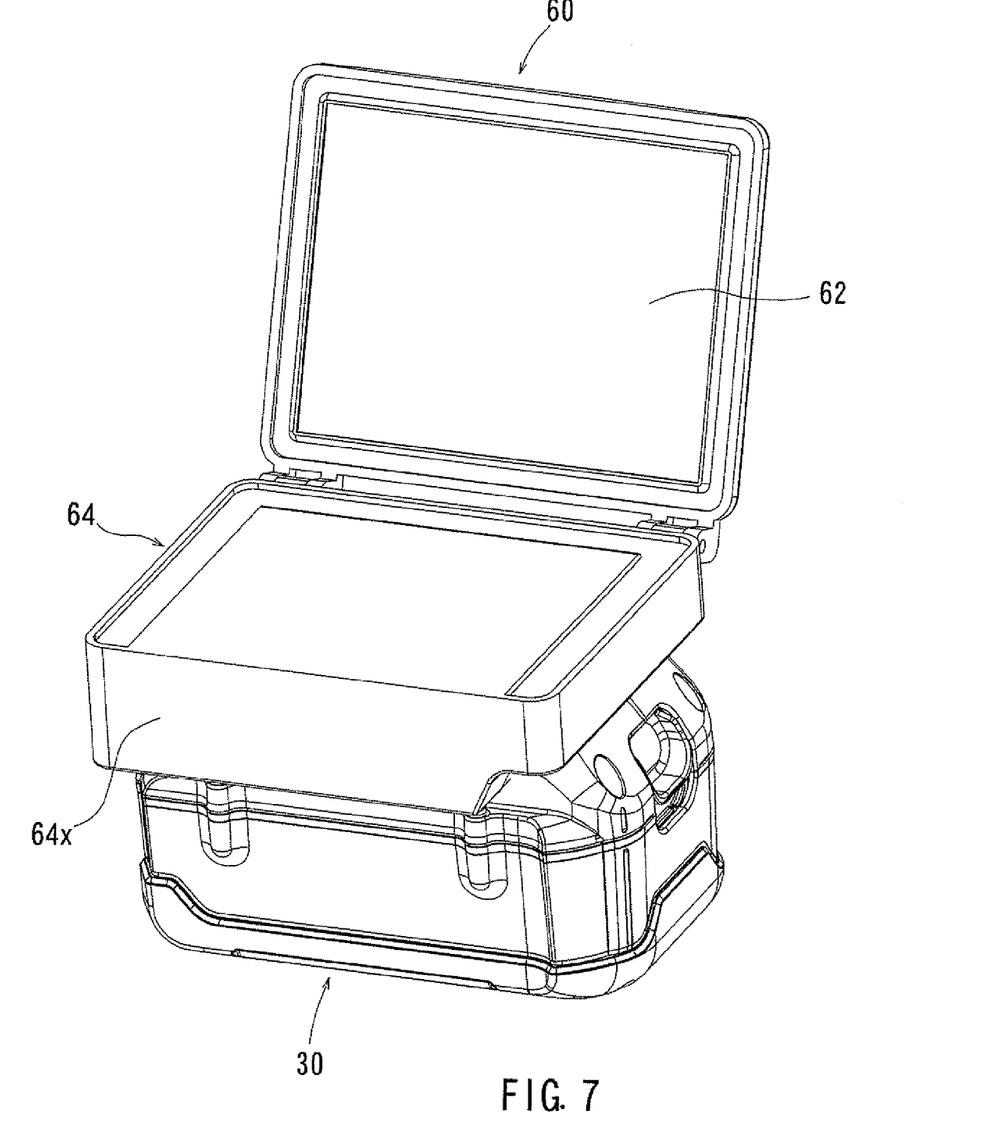
FIG. 7 is a perspective view of the electrical apparatus system in a state in which an electrical apparatus (TV set) is used according to another modification.

FIG. 7 shows a TV set 60 of a laptop personal computer type as another example of the electrical apparatus other than the electrical tool. The TV set 60 includes a door-like monitor unit 62 and a TV body 64. A battery-connecting portion 64$x$ for connecting the tool battery 30 is provided on a lower side of the TV body 64.

Figure 8:
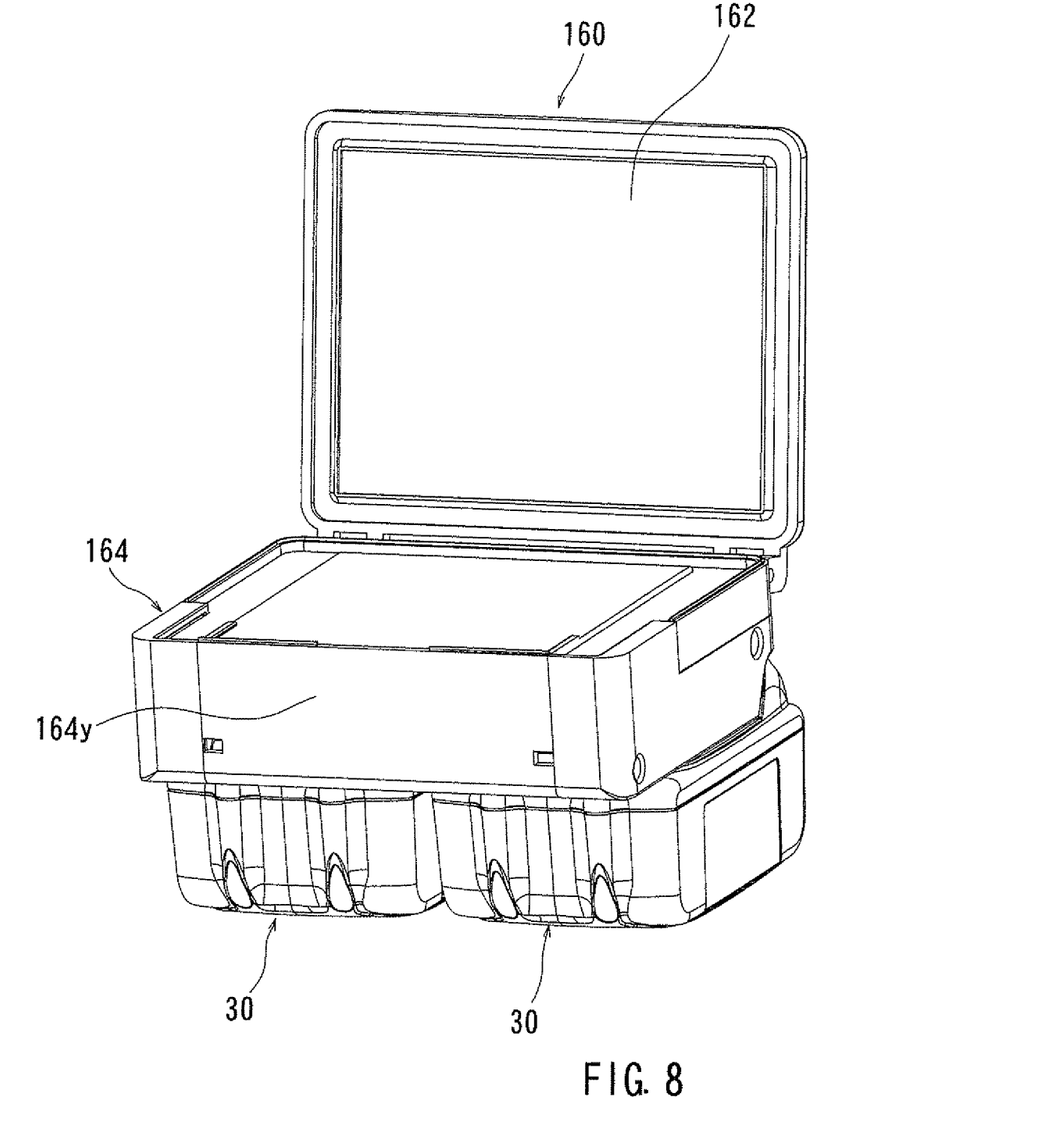
FIG. 8 is a perspective view of the electrical apparatus system in a state in which an electrical apparatus (DVD/Blu-ray player) is used according to still another modification.

FIG. 8 shows a DVD/Blu-ray player 160 of a laptop personal computer type as another example of the electrical apparatus other than the electrical tool. The DVD/Blu-ray player 160 includes a door-like monitor unit 162 and a player body 164. A battery-connecting portion 164y for connecting two tool batteries 30 is provided on a lower side of the player body 164.

Figure 9:
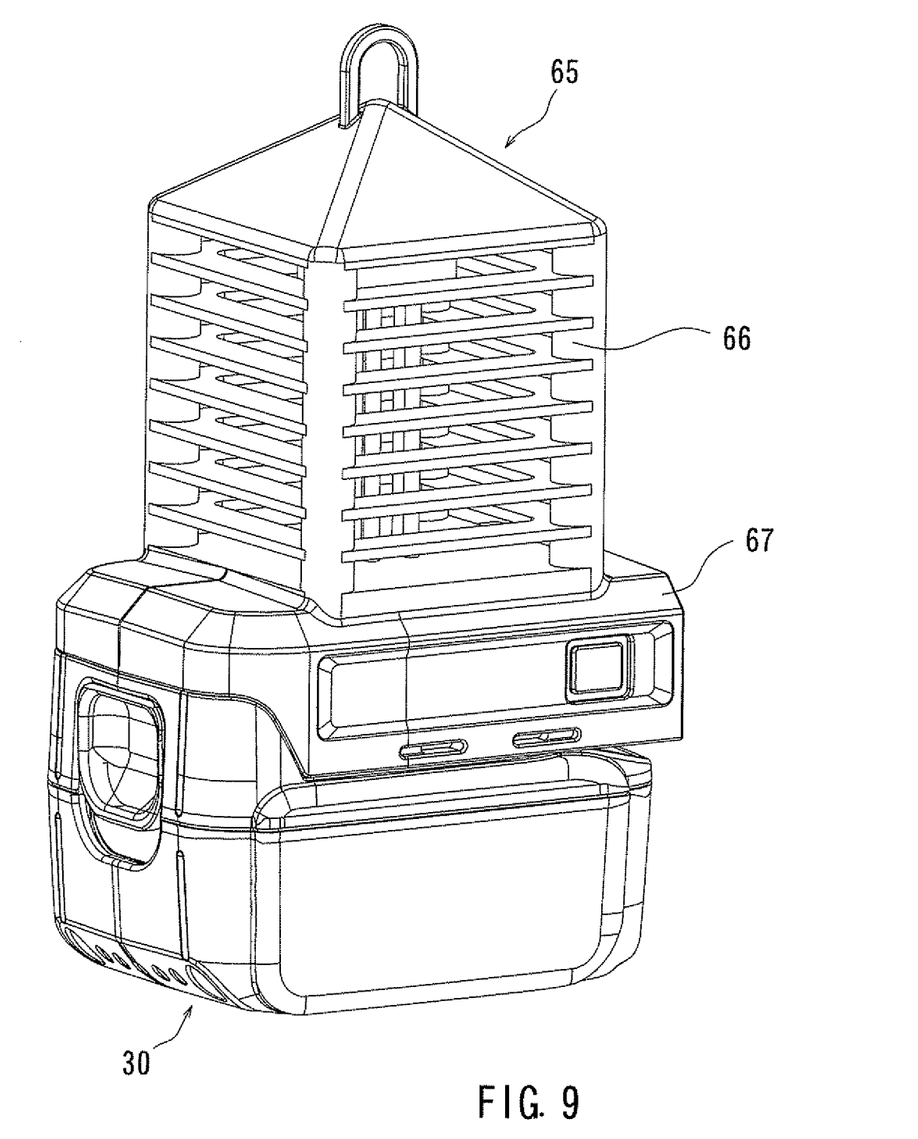
FIG. 9 is a perspective view of the electrical apparatus system in a state in which an electrical apparatus (insect repellent apparatus) is used according to another modification.

FIG. 9 shows a discharging-type insect repellent apparatus 65 as another example of the electrical apparatus other than the electrical tool. The discharging-type insect repellent apparatus 65 includes an insect repellent apparatus body 66 and a battery-connecting portion 67 provided on a lower side of the insect repellent apparatus body 66.

Figure 10:
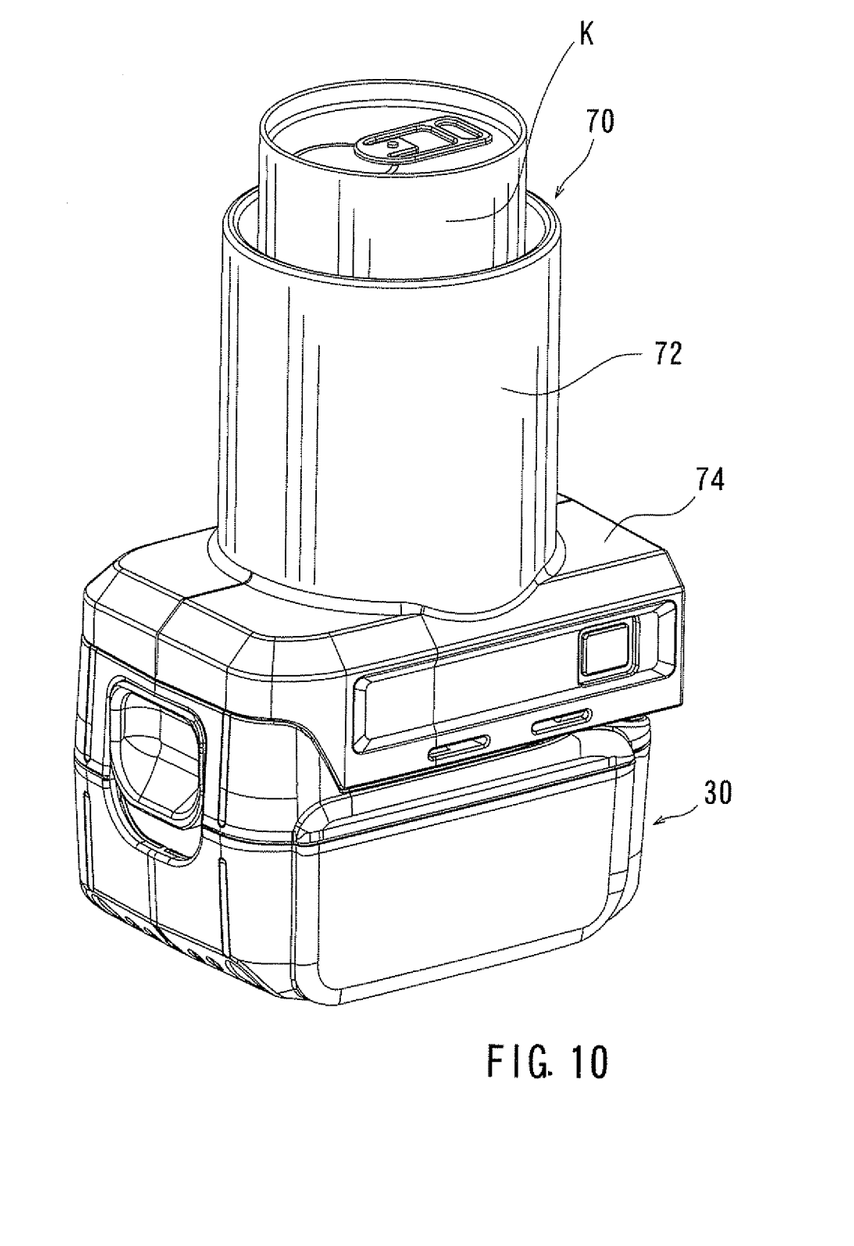
FIG. 10 is a perspective view of the electrical apparatus system in a state in which an electrical apparatus (keep-warm apparatus) is used according to another modification.

FIG. 10 shows a keep-warm apparatus 70 for warming up a canned coffee K or the like as another example of the electrical apparatus other than the electrical tool. The keep-warm apparatus 70 includes a keep-warm apparatus body 72 whose top is open and which is configured to keep hot water at a predetermined temperature, and also includes a battery-connecting portion 74 provided on a lower side of the keep-warm apparatus body 72. Although the keep-warm apparatus 70 is exemplified, a keep-cool apparatus is also applicable.

Figure 11:
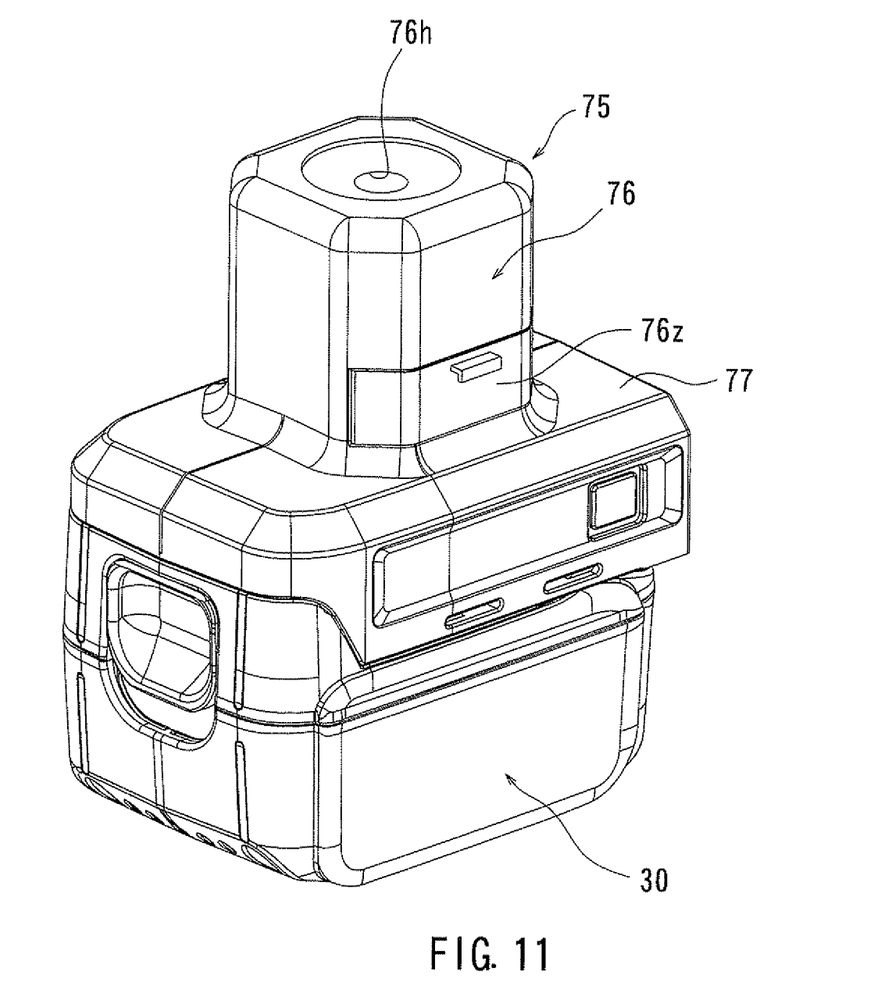
FIG. 11 is a perspective view of the electrical apparatus system in a state in which an electrical apparatus (pencil sharpener) is used according to another modification.

FIG. 11 shows a pencil sharpener 75 as another example of the electrical apparatus other than the electrical tool. The pencil sharpener 75 includes a sharpener boy 76 having a pencil insertion port 76h on an upper surface thereof and a chips-discharging cup 76z on a side surface at a lower end, and a battery-connecting portion 77 provided on a lower side of the sharpener body 76.

Figure 12:
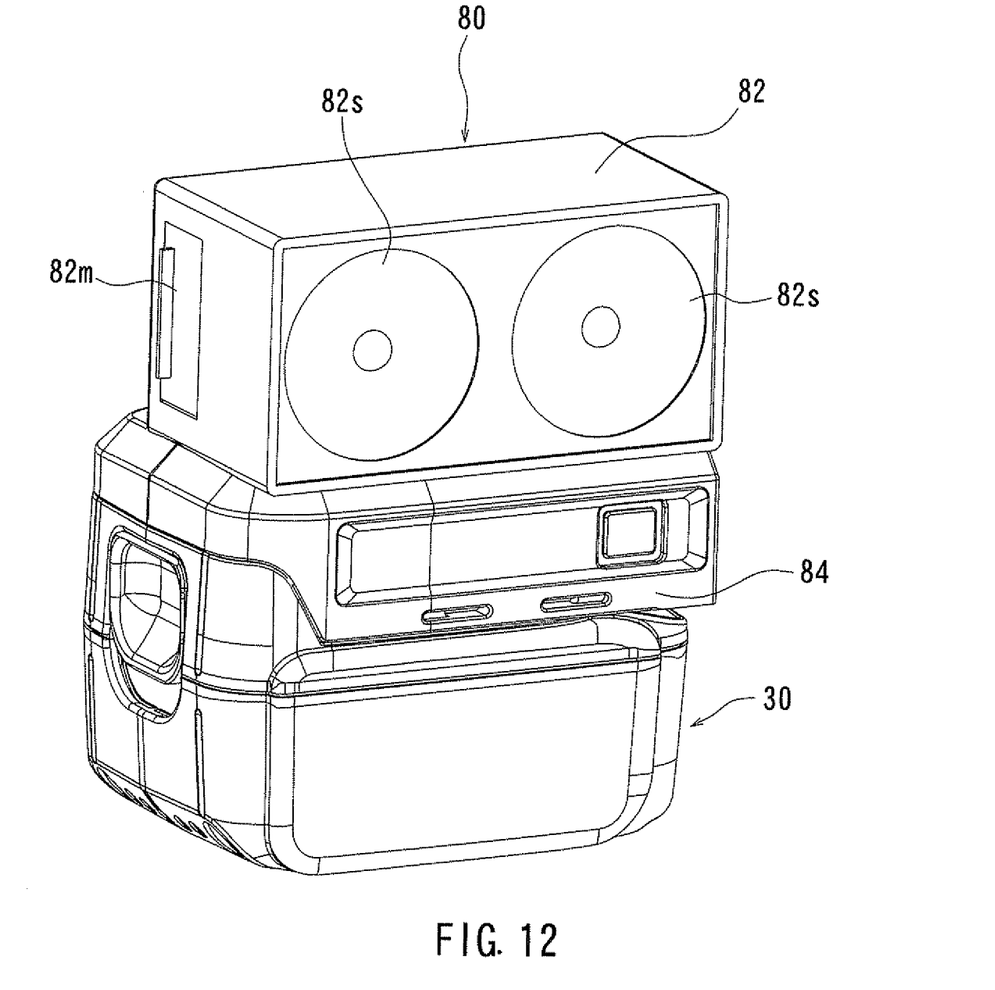
FIG. 12 is a perspective view of the electrical apparatus system in a state in which an electrical apparatus (music reproducer) is used according to another modification.

FIG. 12 shows a music reproducer 80 as another example of the electrical apparatus other than the electrical tool. The music reproducer 80 includes a pair of speakers 82s and a reproducer body 82 having a recording medium insertion portion 82m for a CD disk or the like and a battery-connecting portion 84 provided on a lower side of the reproducer body 82.

Figure 13:
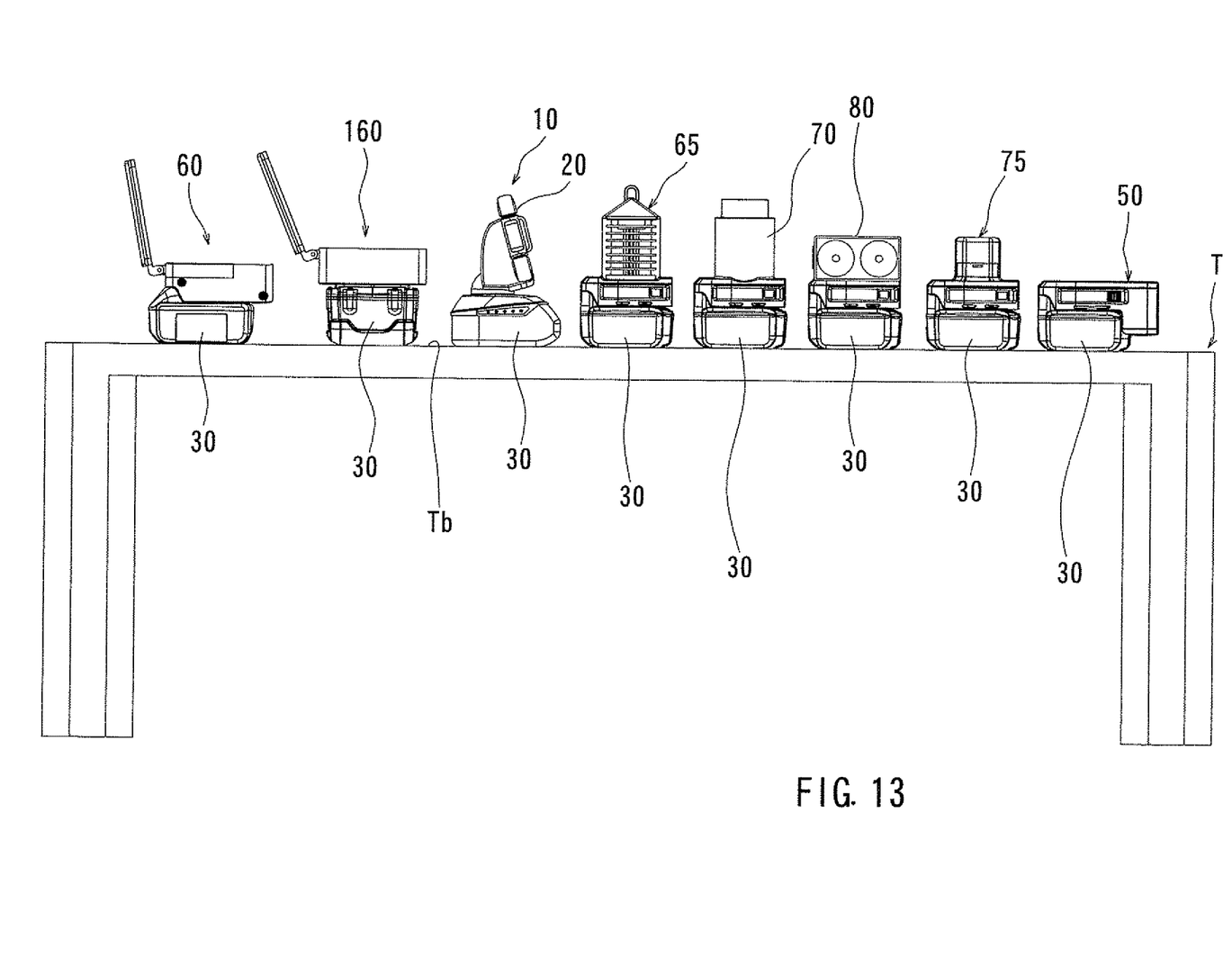
FIG. 13 is a side view showing a state in which all the electrical apparatuses system are arranged on a table according to the embodiment.

FIG. 13 shows a state in which the photo frame 20, the TV sets 50 and 60, the DVD/Blu-ray player 160, the insect repellent apparatus 65, the keep-warm apparatus 70, the pencil sharpener 75, and the music reproducer 80 each supported on the tool battery 3D as a supporting base described in the embodiment are arranged on an installation surface Tb of a table T.

Although the photo frame 20, the TV sets 50 and 60, the DVD/Blu-ray player 160, the insect repellent apparatus 65, the keep-warm apparatus 70, the pencil sharpener 75, and the music reproducer 80 are described as examples of the electrical apparatus, electrical apparatuses other than those described above may also be used. For example, the invention may also be applied to a charger for a light, a radio, an air cleaner, a cooling fan, a cellular phone etc.

We claim:

1. An electrical apparatus system comprising:
a tool battery used as a power source for an electrical tool; and
an electrical apparatus other than the electrical tool, the electrical apparatus having a battery-connecting portion configured to allow the tool battery to be connected thereto and to be disconnected therefrom electrically and mechanically, wherein;
the tool battery is exposed on a lower side of the electrical apparatus and is configured to support the electrical apparatus on an installation surface as a base in a state in which the tool battery is electrically and mechanically connected to the battery-connecting portion of the electrical apparatus;
the battery-connecting portion of the electrical apparatus is provided at a lower end position of the electrical apparatus;
the battery-connecting portion is configured to be connected to an upper surface side of the tool battery by being slid along the upper surface of the tool battery;
a lower surface of the tool battery comes into contact with the installation surface;
the battery-connecting portion of the electrical apparatus includes a rail-shaped ridge portion extending in the sliding direction of the tool battery, the rail-shaped ridge portion having a rectangular groove provided thereal-ong;
the tool battery includes a slide rail portion that is engaged with the rail-shaped ridge portion, the slide rail portion having a lateral ridge portion projecting widthwise outward from an upper side thereof;
the rectangular groove and the lateral ridge portion are configured to fit with each other;
a center of gravity of the system is located in the tool battery in a state in which the electrical apparatus and the tool battery are connected; and
a weight of the electrical apparatus is less than a weight of the tool battery.

2. The electrical apparatus system according to claim 1, wherein:
a body portion of the electrical apparatus includes a lower projecting portion projecting downward with respect to the battery-connecting portion of the electrical apparatus; and
the lower projecting portion of the electrical apparatus is located at a position lower than an upper surface of the tool battery in the state in which the electrical apparatus is connected to the tool battery.

3. The electrical apparatus system according to claim 1, wherein the height of the system is smaller than twice the height of the tool battery in the state in which the electrical apparatus and the tool battery are connected.

4. The electrical apparatus system according to claim 1, wherein a plurality of the tool batteries can be connected to a single electrical apparatus.

5. The electrical apparatus system according to claim 1, wherein a peripheral edge of the electrical apparatus is covered with a cushioning material.

6. The electrical apparatus system according to claim 1, wherein the electrical apparatus is an image display apparatus.

7. The electrical apparatus system according to claim 1, wherein:
the electrical apparatus includes a reading device for a storage medium and an insertion port which allows insertion and removal of the storage medium; and
the insertion port is covered with the tool battery in the state in which the electrical apparatus and the tool battery are connected.

8. The electrical apparatus system according to claim 1, wherein the electrical apparatus is selected from a group consisting of a photo frame, a TV set, an insect repellent apparatus, a keep-warm apparatus, a pencil sharpener, a music reproducer, and a DVD/Blu-ray player.

9. The electrical apparatus system according to claim claim 1, wherein:
the tool battery includes two guide slits in parallel with the slide rail portion; and
a minus terminal is provided inside one of the guide slits and a plus terminal is provided inside the other of the guide slits.

* * * * *